United States Patent [19]

Sperandio

[11] Patent Number: 4,731,229

[45] Date of Patent: Mar. 15, 1988

[54] REACTOR AND PACKING ELEMENT FOR CATALYZED CHEMICAL REACTIONS

[75] Inventor: August Sperandio, Seuzach, Switzerland

[73] Assignee: Sulzer Brothers Limited, Winterthur, Switzerland

[21] Appl. No.: 855,510

[22] Filed: Apr. 23, 1986

[30] Foreign Application Priority Data

May 14, 1985 [EP] European Pat. Off. ........... 85105936

[51] Int. Cl.⁴ .......................... B01J 10/00; B01J 12/00; B01J 35/02
[52] U.S. Cl. ..................................... 422/188; 422/191; 422/222; 422/310; 366/336
[58] Field of Search ............... 422/191, 222, 188, 190, 422/310; 366/336, 337

[56] References Cited

U.S. PATENT DOCUMENTS 3,595,626  7/1971  Sowards .............................. 422/191
3,785,620  1/1974  Huber ................................. 366/340
3,871,624  3/1975  Huber et al. ......................... 366/336
4,340,501  7/1982  Davidson ............................. 422/222

Primary Examiner—Barry S. Richman
Assistant Examiner—Joye L. Woodard
Attorney, Agent, or Firm—Kenyon & Kenyon

[57] ABSTRACT

The reactor for performing heterogeneous catalyzed chemical reactions comprises packing elements which are constructed of corrugated plates having inclined corrugations and catalyst members which are disposed between the plates. In one embodiment, the catalyst members have alternating fluted parts and unfluted parts with the fluted parts disposed within the troughs of the adjacent corrugated plate. In other embodiments, the catalyst members may be in the form of unfluted members, continuously fluted members and members which are disposed in planes between pairs of corrugated plates or within the troughs of the corrugated plates.

17 Claims, 8 Drawing Figures

REACTOR AND PACKING ELEMENT FOR CATALYZED CHEMICAL REACTIONS

This invention relates to a reactor and packing element for catalyzed chemical reactions.

As is known, various types of reactors have been constructed to perform heterogeneous catalyzed chemical reactions. In some cases, the reactors have been constructed with packing elements, for example of the kind described in U.S. Pat. No. 3,871,624 where the individual plates of the packing element are made of or are coated with a catalyst material. However, one disadvantage of such a packing element is that plates made of catalyst material are very expensive since the thickness of each plate is mainly determined by strength requirements related to the liquid and/or gas flows through the packing element. Furthermore, coating of such a plate with a catalyst material is only slightly less expensive.

Accordingly, it is an object of the invention to provide a packing element for catalyzed chemical reactions which can be economically produced.

It is another object of the invention to reduce the cost of a reactor for performing heterogeneous catalyzed chemical reactions.

It is another object of the invention to provide a packing element with a large catalyst area.

Briefly, the invention provides a packing element for catalyzed chemical reactions which is comprised of a plurality of corrugated plates disposed in parallel to a common axis and at least one catalyst member. Each corrugated plate is provided with corrugations which are disposed at an inclination to the common axis while being oppositely directed to the corrugations of an adjacent plate. Each catalyst member is disposed between a pair of adjacent plates.

In accordance with the invention, at least one catalyst member, for example in strip or band or tape form is disposed between the adjacent corrugated plates.

The invention also provides a reactor for performing heterogeneous catalyzed chemical reactions which is comprised of at least one of the packing elements.

The packing element can be constructed in a relatively economical manner since the catalyst members are separate from the corrugated plates. Further, the corrugated plates of the packing element can be fabricated in a consistent manner for reactors for both uncatalyzed and catalyzed reactions. Specifically, in the case of the catalyzed reactions, only the catalyst members need to be provided as an addition. Hence, packing elements can be readily fabricated of only corrugated plates for an uncatalyzed reaction or can be fabricated with the catalyst members for catalyzed reactions.

Further, existing reactors for uncatalyzed reactions can be converted rapidly and cheaply in the same way when they are required to be used for catalyzed reactions. The converse may also be achieved rapidly by removal of the catalyst members.

In one embodiment, the catalyst members can be made with alternating fluted parts and unfluted parts. In this case, the fluted parts are disposed within respective troughs of an adjacent plate while the unfluted parts extend over a respective crest of an adjacent corrugated plate. Further, the fluted part may be fluted on a pitch less than the pitch of the corrugations of an adjacent plate and may also have flutes of an amplitude which increase in a direction toward the center of a respective trough.

In another embodiment, the catalyst members may be fluted over the entire width. In this case, the catalyst members may extend in a planar manner between two corrugated plates or may extend into and along the corrugations of an adjacent plate. In each case, the flutings are on a pitch less than the pitch of the corrugations of the adjacent plate.

In still another embodiment, the catalyst members may be in the form of unfluted strips disposed between a pair of adjacent corrugated plates.

These and other objects and advantages of the invention will become more apparent from the following detailed description taken in conjunction with the accompanying drawings wherein:

FIG. 1 illustrates a diagramatic cross-sectional view through a reactor constructed in accordance with the invention;

FIG. 2 illustrated an exploded view of a packing element constructed without catalyst members;

Figure 1:
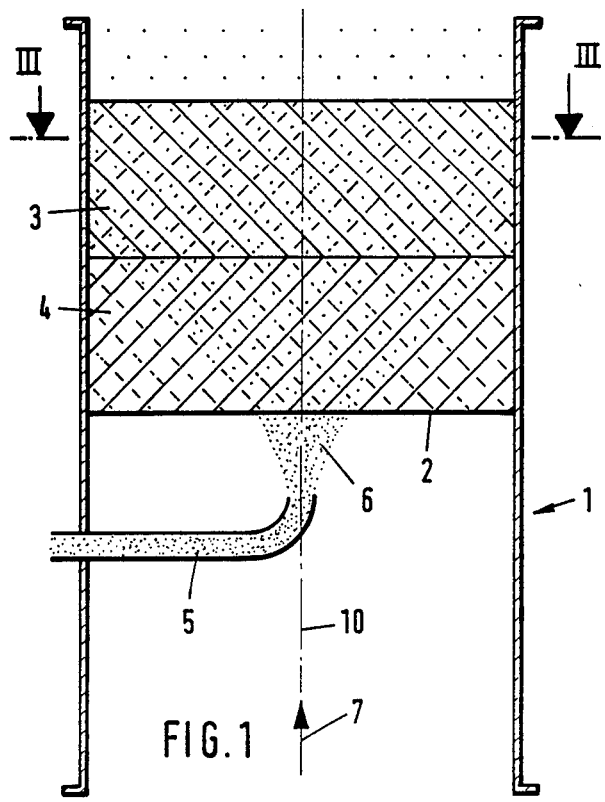

Referring to FIG. 1, the reactor 1 is constructed with a cylindrical vessel and a packing 2 formed of a plurality of packing elements 3, 4, only two of which are shown. The reactor 1 is of generally known construction and need not be further described in detail.

As shown in FIG. 1, the reactor 1 includes a tube 5 through which a fluid 6, for example a gas enters the reactor 1 for catalytic reaction with another fluid, for example a liquid which rises through the reactor as indicated by the arrow 7.

Figure 2:
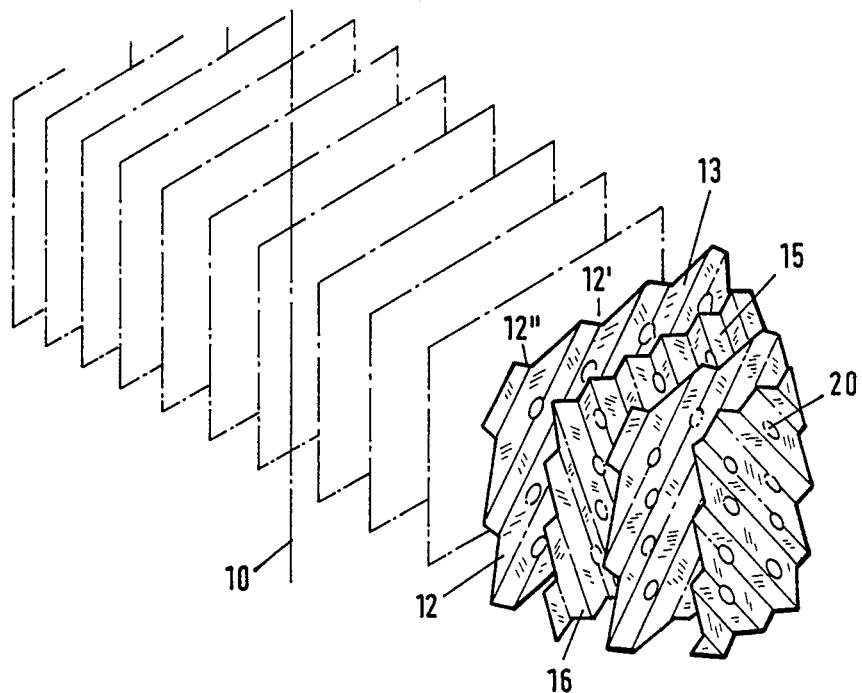

Referring to FIGS. 1 and 2, each packing element is basically formed of a plurality of corrugated plates 12 which are disposed in parallel to a common longitudinal flow axis 10 of the reactor. In this respect, the term "corrugated" in the present context covers connotations which include fluted shapes, toothed shapes and other similar shapes.

Referring to FIG. 2, each plate 12 has corrugations which are disposed at an inclination to the common axis 10 while being oppositely directed to the corrugations of an adjacent plate. For example, the corrugations 13 of plate 12 extend angularly upwardly to the right as viewed relative to the axis 10 whereas the corrugations 15 of the adjacent plate 16 extend angularly upwardly to the left as viewed.

Figure 3:
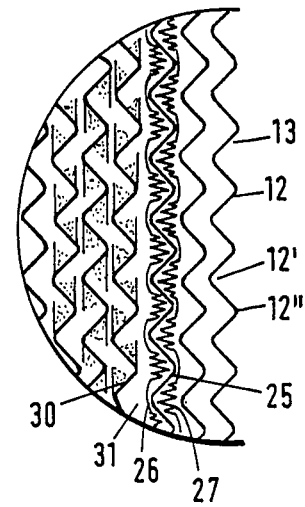
FIG. 3 illustrates a cross sectional view taken on line III—III of FIG. 1.

Referring to FIG. 3, each plate is formed with alternating troughs 12' and crests 12''. Further, as indicated in FIGS. 2 and 3, the plate length increases towards the center of the packing so that the plates together have a cylindrical shape. In this case, a cylindrical tape or band or the like or a pin can be used to hold the plates together.

As indicated in FIG. 2, the plates 12 can be formed with apertures 20 in order to ensure a thorough exchange between the reagents flowing through the packing elements.

Referring to FIG. 3, each packing element is also provided with a plurality of catalyst members 26, 27 in strip or tape or band form which are disposed on either side of each corrugated plate, for example, the plate 25 illustrated. Of note, while only one plate 25 is shown with the catalyst members 26, 27 thereover, it is to be understood that each corrugated plate would be provided with a pair of like catalyst members. Further, in each case, the width of each catalyst member would correspond approximately to the plate height but may be less.

Figure 4:
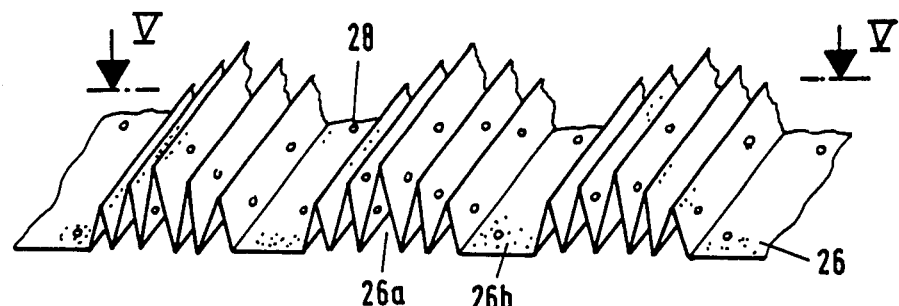
FIG. 4 illustrates a perspective view of a part of a catalyst member constructed in accordance with the invention.
Figure 5:
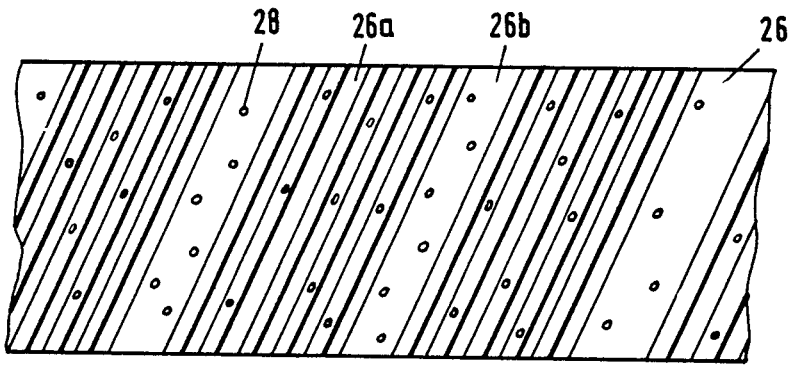
FIG. 5 illustrates a plan view taken on line V—V of FIG. 4.
Figure 6:
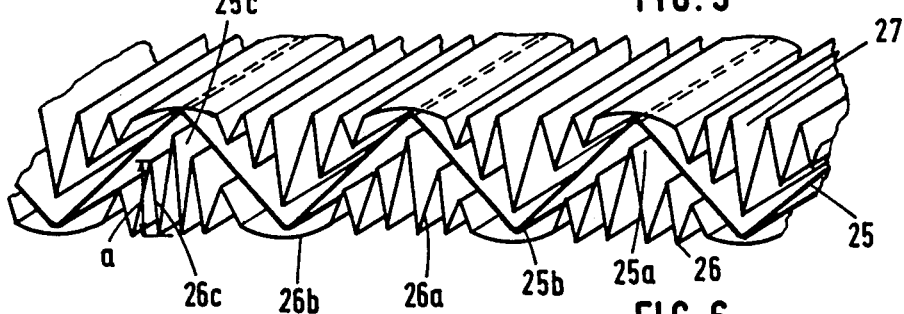
FIG. 6 illustrates a corrugated plate of a packing element having catalyst members disposed on each side in accordance with the invention.

Referring to FIGS. 4 and 5, each catalyst member 26 is constructed with alternating fluted parts 26a and unfluted parts 26b while being provided with apertures 28 throughout these parts 26a, 26b. As indicated in FIG. 5, the fluted parts 26a extend at an angle relative to the length of the member 26. As shown in FIG. 6, the inclination of the fluted parts 26a corresponds to the angle of the corrugations of an adjacent plate 25 of the packing element.

As further shown in FIGS. 3 and 6, the catalyst member 26 follows the troughs 25a and crests 25b of the plate 25. Further, the fluted parts 26a are each disposed in a trough 25a while the unfluted parts 26b extend over a crest 25b. Further, the amplitude a of the discrete flutings 26c in a fluted part 26a increase toward the base 25c of the associated trough 25b, that is, the flutes are of an amplitude which increase in a direction toward the center of a trough 25b of the respective corrugation.

In like manner, the catalyst member 27 is constructed and disposed to fit within the opposite side of the corrugated plate 25.

Referring to FIG. 3, the adjacent corrugated plate 30 which has a corrugation extending in the opposite direction to that of the corrugations of the plate 25 also has corresponding corrugated catalyst members (not shown) on either side. Consequently, two catalyst members having corrugations extending in opposite directions are disposed in a gap 31 between each pair of corrugated plates. Consequently, the catalytically operative area of the packing area is very considerable.

The apertures 28 which are provided in the catalyst members serve to enhance the exchange between the reagents.

As an alternative, each catalyst member may be replaced by a plurality of relatively narrow strip-like catalyst members, possibly with gaps between the strips.

The catalyst members may be made of a catalytically active material. Alternatively, each catalyst member may be formed with a catalytically activated surface or may be a member coated with a catalytically active material.

The catalytically active part of the catalyst members may also be made up of rapidly solidified products (RSP), a material which, of course, has a known strong catalytic action, e.g. glass metal.

The catalyst members may also be constructed in the form of wire netting or wire mesh.

Although the packing element has been described and illustrated as having two catalyst members on either side of a corrugated plate, a single catalyst member may suffice depending upon the required chemical reactions.

Figure 7:
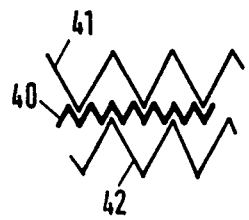
FIG. 7 illustrates a further part view of a modified packing element in accordance with the invention.

Referring to FIG. 7, the catalyst members may also be in the form of strips 40 having flutings perpendicular to the length of the strip 40 and on a pitch which is less than the pitch of the adjacent corrugated plates 41, 42. In this case, the flutings of the catalyst member strip 40 are not in parallel with the corrugations of the respective plates 41, 42.

Figure 8:
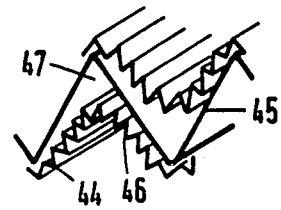
FIG. 8 illustrates a part view of a further modified packing element constructed in accordance with the invention.

Referring to FIG. 8, the catalyst member may be in the form of a fluted strip 44 having flutings on a pitch less than the pitch of an adjacent corrugated plate 45 and which extend parallel to the corrugations of the plate 45. In this case, the catalyst member strip 44 extends into and along the corrugations of the plate 45. As indicated, those parts 46 of the strip 44 which cross over a trough 47 of the plate 45 are engaged therein so as to increase the length of the strip which can be accommodated.

In each of the embodiments described, the corrugated plates may also be catalytically active, for example, by being coated with a catalyst material.

Referring to FIG. 1, the packing element 4 is constructed in the same way as the packing element 3 but is turned relative thereto, for example, by an angle of 90° relative to the longitudinal axis 10 of the reactor.

The invention thus provides a packing element which can be constructed in a relatively simple manner with relatively large catayltically operative areas.

Further, the invention provides a packing element which can be easily converted for use in uncatalyzed reactions and catalyzed reactions.

What is claimed is:

1. A reactor for performing heterogeneous catalyzed chemical reactions comprising
   at least one packing element including a plurality of corrugated plates disposed in said reactor parallel to a longitudinal of said reactor flow axis, each plate having corrugations disposed at an inclination to said axis and oppositely directed in adjacent plates, and at least one catalyst member of tape form, said catalyst member being disposed between a pair of adjacent corrugated plates and being fluted on a pitch less than the pitch of said corrugations of an adjacent plate to provide a relatively large catalytically operating area relative to said adjacent plate.

2. A reactor as set forth in claim 1 wherein said catalyst member has flutings parallel to said corrugations of an adjacent plate.

3. A reactor as set forth in claim 1 wherein said catalyst member is partially disposed in respective corrugations of an adjacent plate.

4. A reactor as set forth in claim 1 wherein each of said plurality of plates has alternating troughs and crests and said catalyst member has alternating fluted parts and unfluted parts with each fluted part in a respective trough of an adjacent plate and each unfluted part extending over a respective crest of said adjacent plate.

5. A reactor as set forth in claim 4 wherein each fluted part has flutes of an amplitude increasing towards the base of a respective trough.

6. A reactor as set forth in claim 1 wherein said packing element has a catalyst member on each of two opposite sides of a respective plate.

7. A reactor as set forth in claim 1 wherein said catalyst member is made of catalytically active material.

8. A reactor as set forth in claim 1 wherein said catalyst member has a catalytically active surface.

9. A reactor as set forth in claim 1 wherein said catalyst member has a coating of catalytically active material.

10. A reactor as set forth in claim 1 wherein said catalyst member has a catalytically active part made of rapidly solidified products.

11. A reactor as set forth in claim 1 wherein said catalyst member has a plurality of apertures therein.

12. A reactor as set forth in claim 1 wherein said catalyst member is made of wire netting.

13. A reactor as set forth in claim 1 wherein at least some of said plates are made of catalyst material.

14. A packing element for catalyzed chemical reactions comprising
a plurality of corrugated plates disposed in parallel to a common axis, each plate having corrugations disposed at an inclination to said axis and oppositely directed to said corrugations of an adjacent plate; and
at least one catalyst member of tape form, said member being disposed between a pair of adjacent plates and being fluted on a pitch less than the pitch of said corrugations of an adjacent plate to provide a relatively large catalytically active area relative to said adjacent plate.

15. A packing element as set forth in claim 14 wherein at least one of said catalyst members has alternating fluted parts and unfluted parts, said fluted parts being disposed with respective troughs of an adjacent plate.

16. A packing element as set forth in claim 14 wherein said catalyst member extends into and along said corrugations of an adjacent plate.

17. A packing element as set forth in claim 14 wherein said catalyst member has flutes of an amplitude which increase in a direction toward the center of a trough of a respective corrugation of an adjacent plate.

* * * * *

UNITED STATES PATENT AND TRADEMARK OFFICE
CERTIFICATE OF CORRECTION

PATENT NO. : 4,731,229

DATED : March 15, 1988

INVENTOR(S) : August Sperandio

It is certified that error appears in the above-identified patent and that said Letters Patent is hereby corrected as shown below:

Column 4, line 37 "of said reactor flow axis" should be -flow axis of said reactor- Signed and Sealed this Twenty-third Day of August, 1988

Attest:

DONALD J. QUIGG

*Attesting Officer*     *Commissioner of Patents and Trademarks*